(12) United States Patent
Grondahl (10) Patent No.: US 8,596,973 B2
(45) Date of Patent: Dec. 3, 2013

(54) LEAF SEAL ASSEMBLY INCLUDING POLYMER MEMBER AND ROTARY MACHINE CONTAINING SUCH SEAL ASSEMBLY

(75) Inventor: Clayton M. Grondahl, Rexford, NY (US)

(73) Assignee: CMG Tech, LLC, Rexford, NY (US)

( * ) Notice: Subject to any disclaimer, the term of this patent is extended or adjusted under 35 U.S.C. 154(b) by 887 days.

(21) Appl. No.: 12/632,224

(22) Filed: Dec. 7, 2009

(65) Prior Publication Data
US 2011/0135454 A1 Jun. 9, 2011

(51) Int. Cl.
*F01D 11/02* (2006.01)
(52) U.S. Cl.
USPC .......................................................... 415/231
(58) Field of Classification Search
USPC .................................. 415/230, 231; 277/355
See application file for complete search history.

(56) References Cited

U.S. PATENT DOCUMENTS

| | | |
|---|---|---|
| 3,917,150 A | 11/1975 | Ferguson et al. |
| 4,204,629 A | 5/1980 | Bridges |
| 4,209,268 A | 6/1980 | Fujiwara et al. |
| 4,274,575 A | 6/1981 | Flower |
| 4,645,217 A | 2/1987 | Honeycutt, Jr. et al. |
| 4,720,969 A | 1/1988 | Jackman |
| 4,812,608 A | 3/1989 | Alexandrov et al. |
| 4,813,608 A | 3/1989 | Holowach et al. |
| 4,940,080 A | 7/1990 | Reeves et al. |
| 5,029,875 A | 7/1991 | Spain et al. |
| 5,042,823 A | 8/1991 | Mackay et al. |
| 5,066,024 A | 11/1991 | Reisinger et al. |
| 5,071,138 A | 12/1991 | Mackay et al. |
| 5,074,748 A | 12/1991 | Hagle |
| 5,076,590 A | 12/1991 | Steinetz et al. |
| 5,090,710 A | 2/1992 | Flower |
| 5,100,158 A | 3/1992 | Gardner |
| 5,106,104 A | 4/1992 | Atkinson et al. |
| 5,108,116 A | 4/1992 | Johnson et al. |
| 5,201,530 A | 4/1993 | Kelch et al. |
| 5,316,318 A | 5/1994 | Veau |
| 5,568,931 A | 10/1996 | Tseng et al. |
| 5,630,590 A | 5/1997 | Bouchard et al. |
| 5,688,105 A | 11/1997 | Hoffelner |
| 5,704,760 A | 1/1998 | Bouchard et al. |
| 5,755,445 A * | 5/1998 | Arora .............................. 277/418 |

(Continued)

FOREIGN PATENT DOCUMENTS

DE 10017643 A1 10/2001

OTHER PUBLICATIONS

Arora, Gul K. et al., "Pressure Balanced Low Hysteresis, Finger Seal Test Results", 35th Joint Propulsion Conference and Exhibit, Los Angeles, CA, Jun. 20-24, 1999, 15 pages.
Steinetz, Bruce M. et al., "Advanced Seal Technology Role in Meeting Next Generation Turbine Engine Goals", Propulsion and Power Systems First Meeting on Design Principles and Methods for Aircraft Gas Turbine Engines, Toulouse, France, May 11-15, 1998, 11 pages.

(Continued)

*Primary Examiner* — Edward Look
*Assistant Examiner* — Liam McDowell
(74) *Attorney, Agent, or Firm* — Hoffman Warnick LLC (57) ABSTRACT

A seal assembly which, among other applications, may be used for sealing fluid leakage between low temperature multistage compressors and pumps, steam turbine rotors and turbine stator bodies. In one embodiment, a seal assembly is provided that includes a leaf seal including a plurality of staggered leaf seal members; and a polymer member disposed on a high pressure side of the leaf seal, wherein the polymer member is in compliant contact with the leaf seal.

20 Claims, 7 Drawing Sheets

(56) References Cited

U.S. PATENT DOCUMENTS

| | | | |
|---|---|---|---|
| 5,794,938 | A | 8/1998 | Hofner et al. |
| 5,794,942 | A | 8/1998 | Vance et al. |
| 5,799,952 | A | 9/1998 | Morrison et al. |
| 5,884,918 | A | 3/1999 | Basu et al. |
| 5,961,125 | A | 10/1999 | Wolfe et al. |
| 5,961,280 | A | 10/1999 | Turnquist et al. |
| 5,975,535 | A | 11/1999 | Gail et al. |
| 5,987,879 | A | 11/1999 | Ono |
| 5,997,004 | A | 12/1999 | Braun et al. |
| 6,010,132 | A | 1/2000 | Bagepalli et al. |
| 6,012,723 | A | 1/2000 | Beeck |
| 6,027,121 | A | 2/2000 | Cromer et al. |
| 6,030,175 | A | 2/2000 | Bagepalli et al. |
| 6,032,959 | A | 3/2000 | Carter |
| 6,042,119 | A | 3/2000 | Bagepalli et al. |
| 6,045,134 | A | 4/2000 | Turnquist et al. |
| 6,059,526 | A | 5/2000 | Mayr |
| 6,079,714 | A | 6/2000 | Kemsley |
| 6,079,945 | A | 6/2000 | Wolfe et al. |
| 6,105,966 | A | 8/2000 | Turnquist et al. |
| 6,105,967 | A | 8/2000 | Turnquist et al. |
| 6,116,608 | A | 9/2000 | Wolfe et al. |
| 6,120,622 | A | 9/2000 | Mayr et al. |
| 6,131,910 | A | 10/2000 | Bagepalli et al. |
| 6,131,911 | A | 10/2000 | Cromer et al. |
| 6,139,018 | A | 10/2000 | Cromer et al. |
| 6,139,019 | A | 10/2000 | Dinc et al. |
| 6,161,836 | A | 12/2000 | Zhou |
| 6,168,162 | B1 | 1/2001 | Reluzco et al. |
| 6,170,831 | B1 | 1/2001 | Bouchard |
| 6,173,958 | B1 | 1/2001 | Dinc et al. |
| 6,173,962 | B1 | 1/2001 | Morrison et al. |
| 6,220,602 | B1 | 4/2001 | Webster et al. |
| 6,267,381 | B1 | 7/2001 | Wright |
| 6,352,263 | B1 | 3/2002 | Gail et al. |
| 6,644,667 | B2 | 11/2003 | Grondahl |
| 7,487,588 | B2 * | 2/2009 | Hogg et al. ............ 29/888.3 |
| 7,670,111 | B2 * | 3/2010 | Maass et al. ............ 415/230 |
| 7,946,591 | B2 * | 5/2011 | Pabst et al. ............ 277/417 |
| 2001/0030397 | A1 | 10/2001 | Beichl |
| 2002/0093140 | A1 * | 7/2002 | Wright ............ 277/309 |
| 2004/0150165 | A1 * | 8/2004 | Grondahl ............ 277/355 |
| 2010/0068042 | A1 * | 3/2010 | Bruck et al. ............ 415/174.2 |

OTHER PUBLICATIONS

"Performance and Reliability Improvements for Heavy-Duty Gas Turbines", GE Power Systems GER-3571H, Apr. 2000, pp. 5-6.

Hendricks, Robert C. et al., "Two-Way Brush Seals Catch a Wave", 1997 International Gas Turbine & Aeroengine Congress & Exhibition, Orlando, Florida, pp. 1-7.

"Retractable Brush Seal Optimizes Efficiency and Availabilityfor Cycling and Baseloaded Steam Turbines", http://www.crossmanufacturing.com, 2 pages.

"Brush Seals", http://www.crossmanufacturing.com, 1 page.

"Brush Sealing Technology for Gas Turbines", http://www.powmat.com, pp. 1-4.

U.S. Appl. No. 10/624,338, "Notice of Allowance", May 15, 2009, 7 pages.

U.S. Appl. No. 10/624,338, "Amendment to Office Action", Oct. 28, 2008, 8 pages.

U.S. Appl. No. 10/624,338, "Office Action", Jul. 29, 2008, 13 pages.

U.S. Appl. No. 10/624,338, "RCE Amendment", Mar. 27, 2008, 15 pages.

U.S. Appl. No. 10/624,338, "Final Office Action", Dec. 31, 2007, 11 pages.

U.S. Appl. No. 10/624,338, "Amendment to Office Action", Oct. 12, 2007, 15 pages.

U.S. Appl. No. 10/624,338, "Office Action", Jul. 16, 2007, 15 pages.

U.S. Appl. No. 10/624,338, "Amendment to Office Action", Apr. 12, 2007, 12 pages.

U.S. Appl. No. 10/624,338, "Office Action", Jan. 16, 2007, 9 pages.

U.S. Appl. No. 10/624,338, "Pre-Appeal Brief Conference", Sep. 28, 2006, 5 pages.

U.S. Appl. No. 10/624,338, "Final Office Action", Aug. 23, 2006, 14 pages.

U.S. Appl. No. 10/624,338, "Amendment to Office Action", Jun. 8, 2006, 20 pages.

U.S. Appl. No. 10/624,338, "Office Action", Mar. 9, 2006, 10 pages.

U.S. Appl. No. 10/624,338, "Amendment to Office Action", Dec. 21, 2005, 16 pages.

U.S. Appl. No. 10/624,338, "Office Action", Sep. 21, 2005, 11 pages.

U.S. Appl. No. 10/624,338, "Amendment to Office Action", Mar. 17, 2005, 19 pages.

U.S. Appl. No. 10/624,338, "Office Action", Dec. 17, 2004, 21 pages.

* cited by examiner

LEAF SEAL ASSEMBLY INCLUDING POLYMER MEMBER AND ROTARY MACHINE CONTAINING SUCH SEAL ASSEMBLY

BACKGROUND OF THE INVENTION

This application is related in some aspects to U.S. Pat. No. 5,578,509, issued Aug. 25, 2009 and entitled "Seal Assembly and Rotary Machine Containing Such Seal," and U.S. patent application Ser. No. 12/546,248, filed Aug. 24, 2009, entitled "Seal Assembly and Rotary Machine Containing Such Seal," which are hereby incorporated by reference.

TECHNICAL FIELD

The present invention relates generally to seals for rotary machines and, more particularly, to a leaf seal assembly including a polymer member and rotary machine containing such seal assembly.

CROSS-REFERENCE TO RELATED PATENTS

This application is related in some aspects to U.S. Pat. No. 5,578,509, issued Aug. 25, 2009 and entitled "Seal Assembly and Rotary Machine Containing Such Seal," which is hereby incorporated by reference.

BACKGROUND

In many rotary machines, such as a multi-stage centrifugal compressor or pump, a fluid is compressed by successive stages, or in turbines, a fluid is expanded in successive stages. Both turbine and compressor stage(s) have stationary or non-rotating components, e.g., vanes, cooperating with rotating components, e.g., blades, for compressing and expanding the operational fluid. The operational fluids change in pressure through the machine and a variety of seals are provided to preserve the differential pressures where necessary to maximize machine efficiency and performance. An exemplary seal may be provided between a turbine or compressor rotor and a cooperating stator or stator body so the rotor may be pressurized to provide thrust balance relative to the rearwardly directed force generated by the equipment and the forward direction of the equipment.

In the above-described settings, the seals used must address the close operating clearances required in machinery of this type. Rotary machine seal design also requires consideration of the relative motion between components produced by the differential thermal expansion and system pressure that occurs throughout the machinery operating cycle compared to shutdown clearance at assembly and transient rotor dynamic displacements traversing critical shaft speeds.

One type of seal that can be used is a leaf seal. Leaf seals are used to effect a non-hermetic seal between abutting structural components in a turbo machine or other apparatus wherein a high pressure area is present on one side of the structural components and a low pressure area is present on the opposite side thereof. Leaf seals are typically relatively thin, compliant sections which may be manufactured to include narrow, precision slots to produce the desired seal member geometry. Where the structural components to be sealed are annular in shape, as in many components of turbo machines, segmented leaf seals are employed, i.e., relatively short, arcuate-shaped leaf seals which abut one another to form an essentially continuous annular seal between the structural components.

Regardless of the particular shape of the structural components to be sealed, leaf seals are movable to a closed, sealing position in which they engage (not necessarily contact) each structural component and seal the space therebetween, and an open position in which at least one portion of the leaf seals disengage a structural component and allows the passage of gases in between such components.

An example of a seal assembly including leaf seals can be found in U.S. Pat. No. 7,578,509, which is incorporated herein by reference. As the '509 patent discloses, a plurality of metallic leaf seal members can be provided, and each leaf seal member may be angled between their free ends and their fixed ends and may include a support for supporting the angle. Seal member geometry is engineered with respect to thickness, width, length, and number of members to meet specific application requirements of differential pressure and anticipated differential motion. The support serves to limit member movement in one direction and withstand differential pressure, while force imposed by a rub engagement on a rotating component is reduced with the elastic flexure of the seal assembly. Seal member end geometry may be shaped to provide a precision diameter and may also incorporate geometry for aerodynamic lift that would minimize wear in those rotor seal applications that anticipate a heavy transient rub.

However, inter-leaf leakage can occur between metallic leaf seal members of successive seal element layers.

SUMMARY OF THE INVENTION

In accordance with embodiments of this invention a seal assembly is provided that has a number of metallic leaf seal members and at least one polymer top member that acts in cooperation with the metallic leaf seals to minimize shaft seal leakage.

A first aspect of the invention provides a seal assembly comprising: a leaf seal including a plurality of staggered leaf seal members; and a polymer member disposed on a high pressure side of the leaf seal, wherein the polymer member is in compliant contact with the leaf seal.

A second aspect of the invention provides a rotary machine comprising: a rotatable component and a non-rotatable component, the components lying about a common axis; and a seal assembly between the components, the seal assembly including: a leaf seal including a plurality of staggered leaf seal members, and a polymer member disposed on a high pressure side of the leaf seal, wherein the polymer member is in compliant contact with the leaf seal.

The foregoing and other features and advantages of the invention will be apparent from the following more particular description of preferred embodiments of the invention.

BRIEF DESCRIPTION OF THE DRAWINGS

The preferred embodiments of this invention will be described in detail, with reference to the following figures, wherein like designations denote like elements, and wherein.

DETAILED DESCRIPTION

A seal assembly is disclosed herein which minimizes inter-leaf leakage between metallic leaf seal members of successive seal element layers. Shaft sealing in turbo machinery operating at temperatures within the capability of organic compound polymers such as polytetrafluoroethylene (PTFE), e.g. 'Teflon®' (Dupont's trade name), can reduce seal leakage by utilizing a polymer top seal element that is solid, i.e., not slotted, thereby eliminating essentially all inter-leaf leakage. PTFE can be used at service temperatures to approximately 500° F. that is within the operating regime of compressors, pumps and other turbo machinery.

In view of the above, a seal assembly is disclosed herein that includes a polymer top member that is continuous, i.e., not slotted, and acts in cooperation with metallic leaf seal elements to minimize shaft seal leakage for applications operating within the continuous service temperature of polymers such as PTFE.

Figure 1:
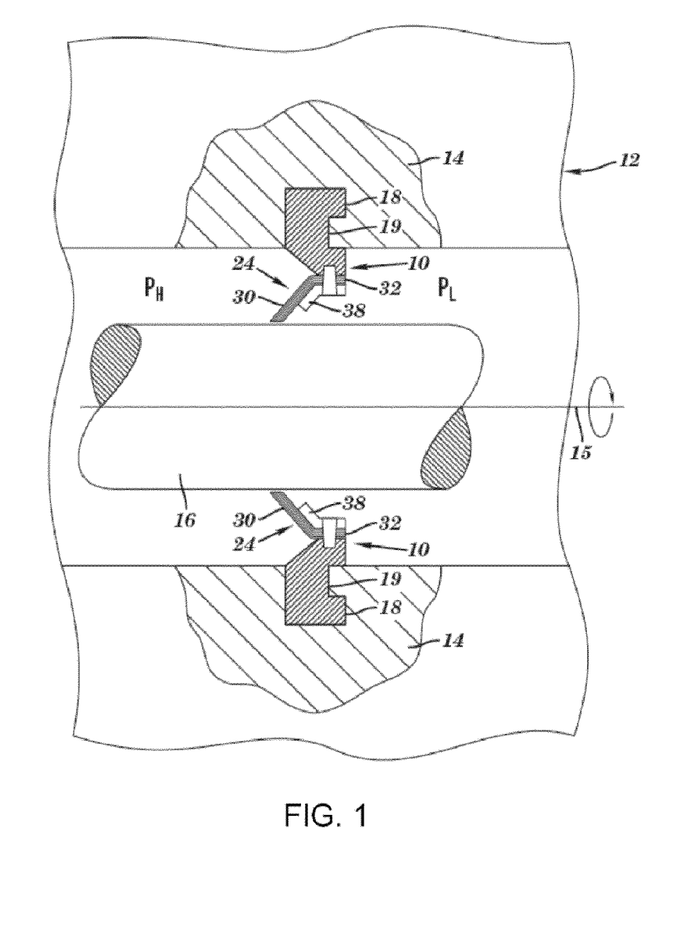
FIG. 1 shows a rotary machine including an illustrative embodiment of a seal assembly including leaf seal members.
Figure 2:
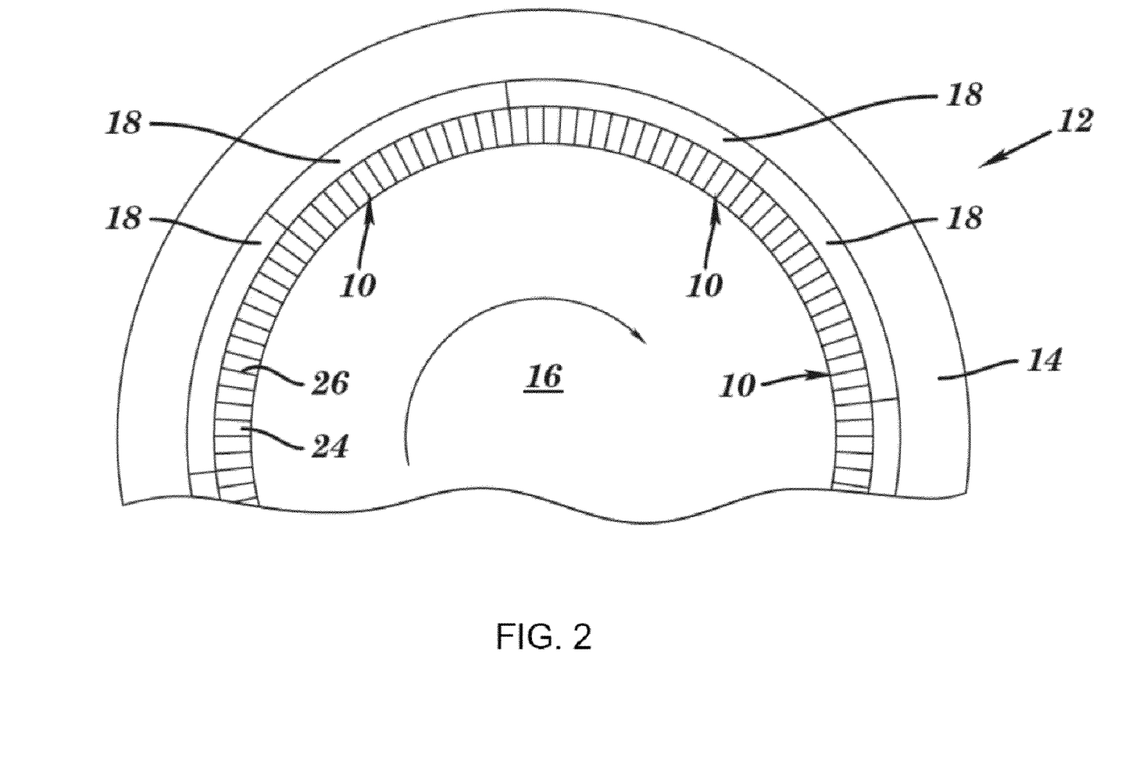
FIG. 2 shows a rotary machine including a number of illustrative leaf seal assemblies.

Referring to FIGS. 1 and 2, a seal assembly 10 for use with a rotary machine 12 including a plurality of leaf seal members 24 is shown, as disclosed in U.S. Pat. No. 7,578,509, which is incorporated herein by reference. Rotary machine 12 may be any well known machinery that includes a non-rotating component 14 and a rotating component 16 having a longitudinal axis 15, e.g., a centrifugal compressor, a pump or a steam turbine, etc. For description purposes, embodiments of the present invention will be described in terms of a centrifugal compressor or steam turbine having a stator or stator body 14 and a rotor 16. As shown in FIG. 1, a higher pressure chamber $P_H$ and a lower pressure chamber $P_L$ are generated during steady state operation of rotary machine 12. Pressure from higher pressure chamber $P_H$ is exerted against at least part of seal assembly 10, which acts to seal higher pressure chamber $P_H$ from lower pressure chamber $P_L$. FIG. 2 shows an embodiment of rotary machine where a number of arcuate seal assemblies 10, including a plurality of leaf seal members 24 having slots 26 therebetween, are utilized about rotating component 16.

Figure 3:
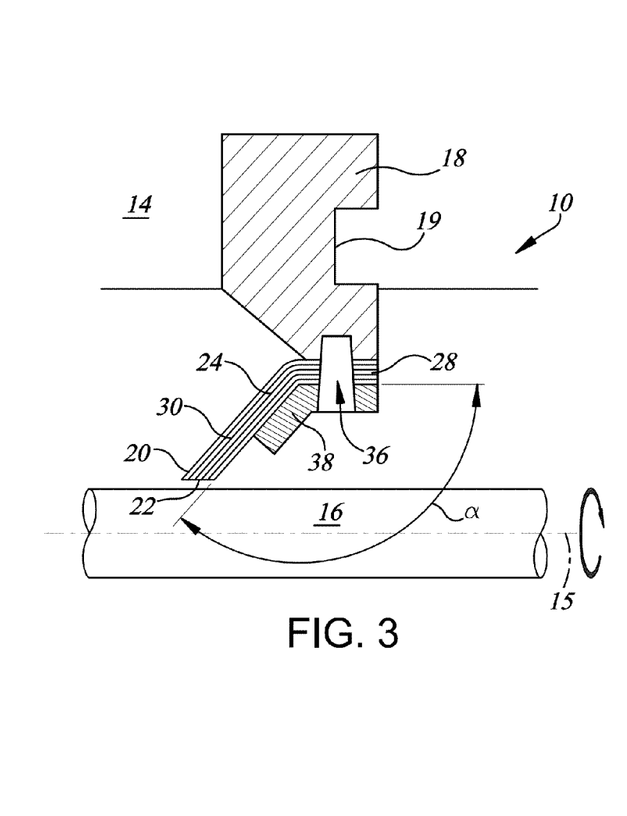
FIG. 3 shows a cross-sectional view of the illustrative embodiment of the seal assembly of FIG. 1.
Figure 4:
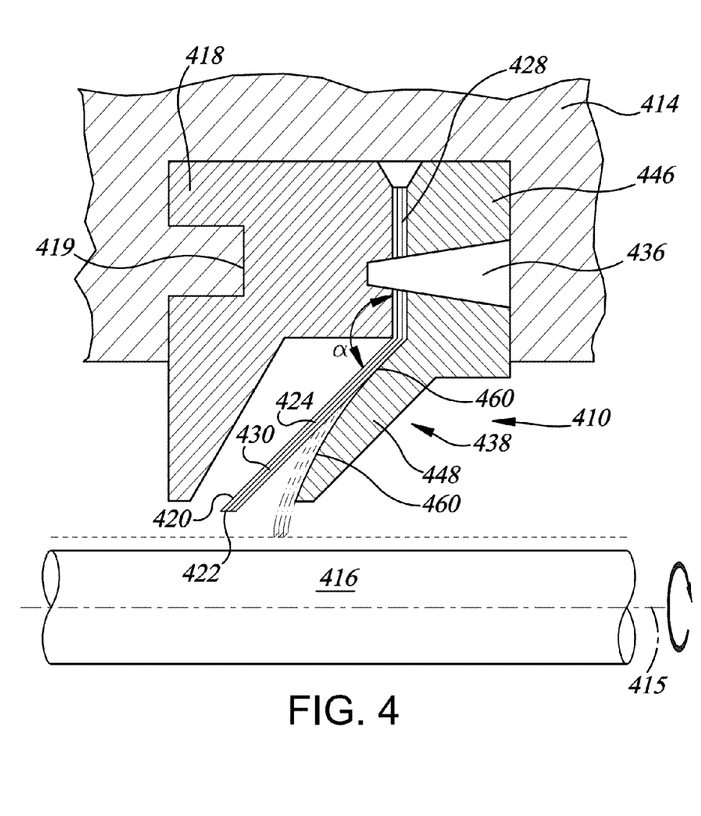
FIG. 4 shows a cross-sectional view of another illustrative embodiment of the seal assembly of FIG. 1.

Turning to FIGS. 3 and 4, two seal assemblies 10, 410 illustrating two different configurations, are shown. Seal assemblies 10, 410 each include at least a first element 20, 420 and a second element 22, 422. Elements 20, 22 (and 420, 422) are layered together (juxtaposed) and carried by non-rotating component 14, 414. Elements 20, 22 (and 420, 422) are preferably made of a high tensile strength material, e.g., a nickel-based or cobalt alloy material. Elements 20, 22 (420, 422) also have a thickness, width, length and number set to meet application requirements such as differential pressure and differential motion of the particular rotary machine 12 (FIG. 1) at issue. In one embodiment, elements 20, 22 (and 420, 422) are coupled to a holder 18, 418 that is coupled to non-rotating component 14, 414. Each seal assembly 10, 410 is preferably provided as an arcuate structure such that a number of seal assemblies 10, 410 can be circumferentially disposed about rotating component 16, 416 to create a seal. In this case, as shown in FIGS. 3 and 4, holder 18, 418 is preferably non-rotatably held in a key slot 19, 419 of non-rotating component 14, 414 that is concentric with rotating component 16, 416. As an alternative embodiment, however, seal assemblies 10 may be provided as an annulus and elements 20, 22 may be provided by a spiral of a single strip of material. While a particular structure has been disclosed for holding seal assemblies 10, 410, it should be recognized that a number of other mechanisms of mounting seal assemblies 10, 410 to non-rotating component 14, 414 may be possible.

Returning to FIGS. 3 and 4, each seal member 24, 424 includes a fixed end or portion 28, 428 and a free end or portion 30, 430. Each seal member 24, 424 also preferably includes an angle $\alpha$ between their respective fixed end 28, 428 and free end 30, 430 thereof. Various embodiments for positioning fixed end 28, 428 and free end 30, 430 within leaf seal assemblies 10, 410 are possible. Two such embodiments are shown in FIGS. 3 and 4. For example, in FIG. 3 (and also FIG. 1), fixed end 28 is substantially parallel with respect to longitudinal axis 15 of rotor 16. An alternative embodiment is shown in FIG. 4, where fixed end 428 is substantially perpendicular with respect to longitudinal axis 415 of rotor 416. FIGS. 3 and 4 illustrate an angle $\alpha$ of approximately 135 degrees, which presents leaf seal members 24, 424 at approximately 45 degrees relative to rotating components 16, 416. It should be recognized that while an angle of 135 degrees has been shown, angle $\alpha$ may be set at any other angle that is necessary for the specific design in issue.

As shown in FIGS. 3 and 4, seal assembly 10, 410 may also include a support 38, 438 for supporting the angle $\alpha$ and seal members 24, 424. Support 38, 438 preferably bears a substantial portion of seal assembly 10, 410 differential pressure with minimal distortion during normal operating conditions. In either seal assembly configuration (i.e., FIG. 3 or FIG. 4), angle $\alpha$ and support 38, 438 provides relief between seal members 24, 424 and holder 18, 418. This relief functions to accommodate relative motion between non-rotating component 14, 414 and rotating component 16, 416 when seal members 24, 424 rub on rotating component 16, 416. Since the full length of seal member 24, 424 may be deflected during such a rub, the seal member tip (free end) force on rotating component 16, 416 is reduced. As shown in FIG. 4 (and is also applicable to the arrangement of FIG. 3), support 438 can include an arcuate mount portion 446 (arcuatily extending into and/or out of page) compatible with arcuate fixed end 428, e.g., substantially perpendicular to longitudinal axis 415 of rotatable component 416, and an arcuate support portion 448 (extending into and/or out of page) compatible with free portion 430. As an alternative, support portion 448 of support 438 may include a curved surface 460.

As shown in FIGS. 3 and 4, a weld 36, 436 may be provided through elements 20, 22 (420, 422) and support 38, 438 to couple elements 20, 22 (420, 422) to holder 18, 418. Other connection mechanisms may also be employed.

In operation, as shown in FIG. 1, seal assembly 10 is carried by non-rotating component 14 in such a way that free ends 30 of seal members 24 slidably engage rotating component 16. Seal assembly 10 creates a seal between chambers $P_H$ and $P_L$ and seal members 24 resist flexure in one direction by the provision of angle $\alpha$ and support 38.

Various embodiments of seal assemblies 10, 410 as well as various methods of fabrication of seal assemblies 10, 410 are described and illustrated in U.S. Pat. No. 7,578,509, which is incorporated herein by reference.

Figure 5:
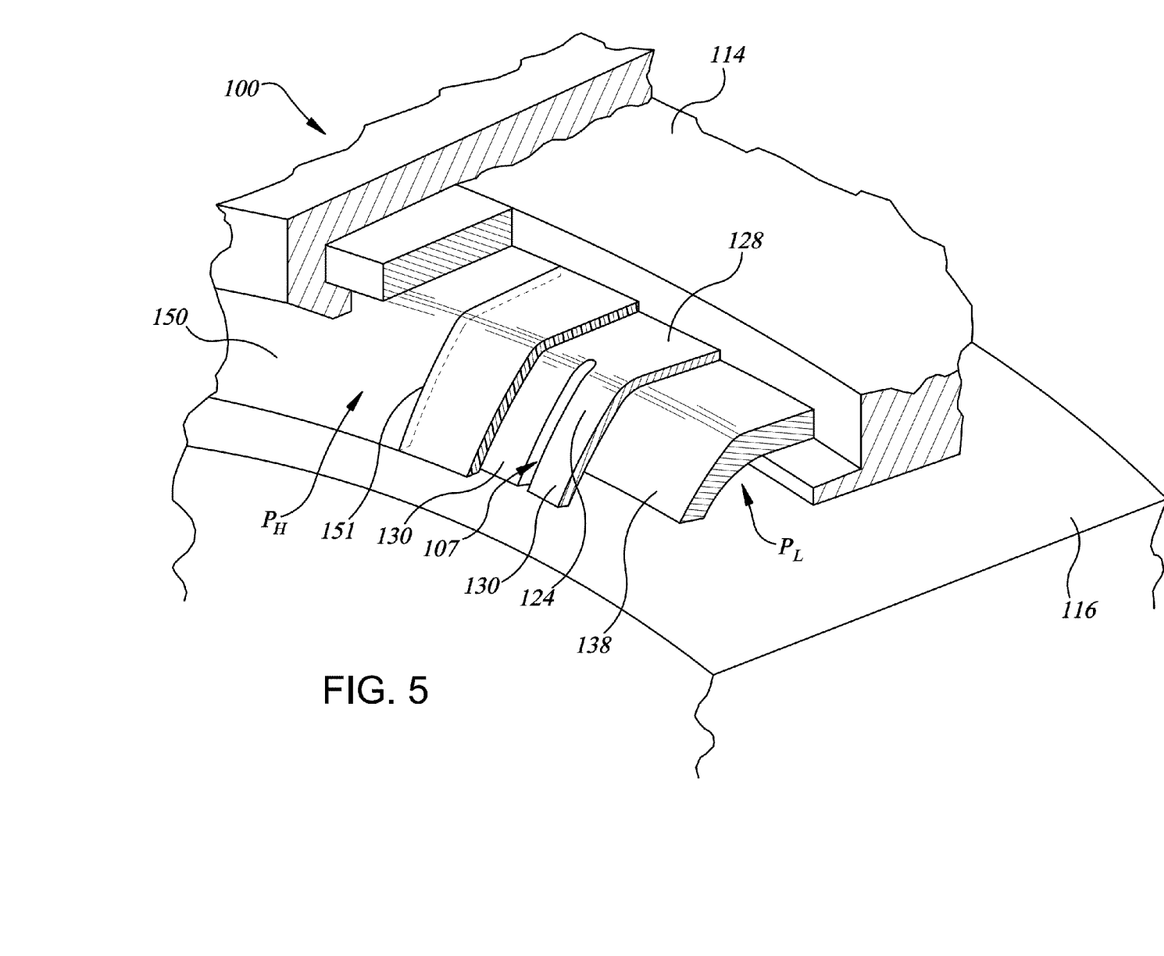
FIG. 5 shows an isometric view of an embodiment of the seal assembly according to embodiments of this invention.
Figure 6:
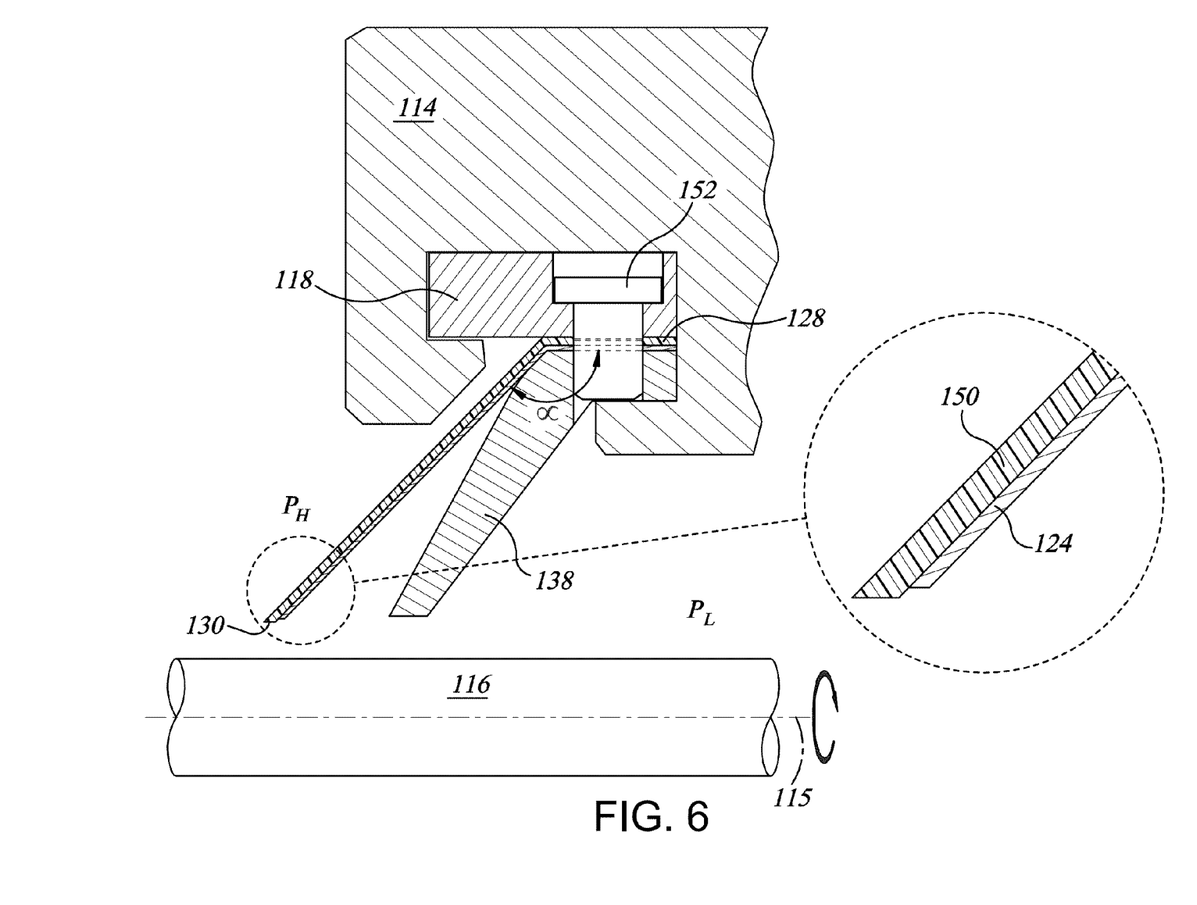
FIG. 6 shows a section view of an embodiment of the seal assembly according to embodiments of this invention.

Turning to FIGS. 5 and 6, a seal assembly 100 for use in a rotary machine (not shown) according to embodiments of this invention is shown. As shown in FIG. 5, a plurality of leaf seal members 124 (e.g., similar to leaf seal members 24, 424 (FIGS. 3 and 4), discussed herein) are provided, with a slot 107 between leaf seal members 124. Leaf seal members 124 can be formed from any resilient high strength alloy suitable for the operating temperature and is compatible with the system fluid. FIG. 5 further shows a non-rotating body 114 cut away to illustrate seal assembly 100. As in FIGS. 1-4, seal assembly 100 further includes a support member 138 (e.g., similar to support members 38, 438 (FIGS. 3 and 4) discussed herein) to support leaf seal members 124. Each leaf seal member 124 includes a fixed end or portion 128 and a free end or portion 130. In operation, seal assembly 100 is carried by non-rotating component 114 in such a way that free ends 130 of seal members 124 slidably engage a rotating component 116. In this way, seal assembly 100 creates a seal between a higher pressure chamber $P_H$ and a lower pressure chamber $P_L$ which are generated during steady state operation of the rotary machine (not shown). Leaf seal members 124 and support member 138 can comprise any known or later developed leaf seal assembly, including as disclosed in U.S. Pat. No. 7,587,509 which is incorporated herein by reference.

As shown in FIG. 5, seal assembly 100 further includes at least one polymer member 150 disposed on leaf seal members 124. Polymer member 150 is disposed along leaf seal members 124 such that polymer member 150 takes on the shape of leaf seal members 124, i.e., similar angles and curvature. As shown in FIG. 6, polymer member 150 and leaf seal members 124 are coupled to a holder 118 (e.g., similar to holder 18, 418 (FIGS. 3 and 4) discussed herein) that is coupled to non-rotating component 114. FIG. 6 also illustrates angle α between fixed ends 128 and free ends 130 of leaf seal members 124.

In non-segmented seal applications, polymer member 150 can be a 360° ring assembled with metallic leaf seal members 124 and support member 138. The elastic modulus of polymers is low relative to typical metallic materials used for leaf seal members 124 and therefore polymer member 150 will tend to compress into compliance with underlying leaf seal members 124 as leaf seal members 124 deflect toward support member 138 with application of pressure. The strength of polymers in tension and compression is substantially less than metallic leaf seal members 124 and especially so at temperatures approaching their maximum continuous service temperature. Polymer member 150 may therefore be thicker than underlying metallic leaf seal members 124 that they are in compliant contact with. For example, polymer member 150 may have a thickness of approximately 0.04 inches while metallic leaf seal members 124 may each have a thickness of approximately 0.01 inches.

A width of slots 107 between underlying leaf seal members 124 can be made very narrow when operating in the pressurized state so as to provide near continuous support of polymer member 150. Functionally, the stronger metallic leaf seal members 124 control the deflection of polymer member 150 from a large clearance when unpressurized to a small clearance in the pressurized operating state. The delayed deflection of leaf seal members 124 and polymer member 150 until near operating conditions avoids startup and shutdown shaft movements that cause seal damage.

Because polymers are relatively soft, polymer seal member 150 may be machined to be undersized relative to the shaft seal diameter and allowed to rub and 'wear in' during initial operation. 'Wear in' of the controlling seal member provides a minimum operating seal clearance essentially limited only by the dimensional run-out of the rotor seal surface. Metallic leaf seal members 124 may be provided with larger internal diameters than the internal diameter of polymer member 150 to avoid contact with the rotor that may create distress. In addition, polymer member 150 in segmented leaf seals may require a radial cut 151 coincident with the end of each segment, as shown in FIG. 5.

Figure 7:
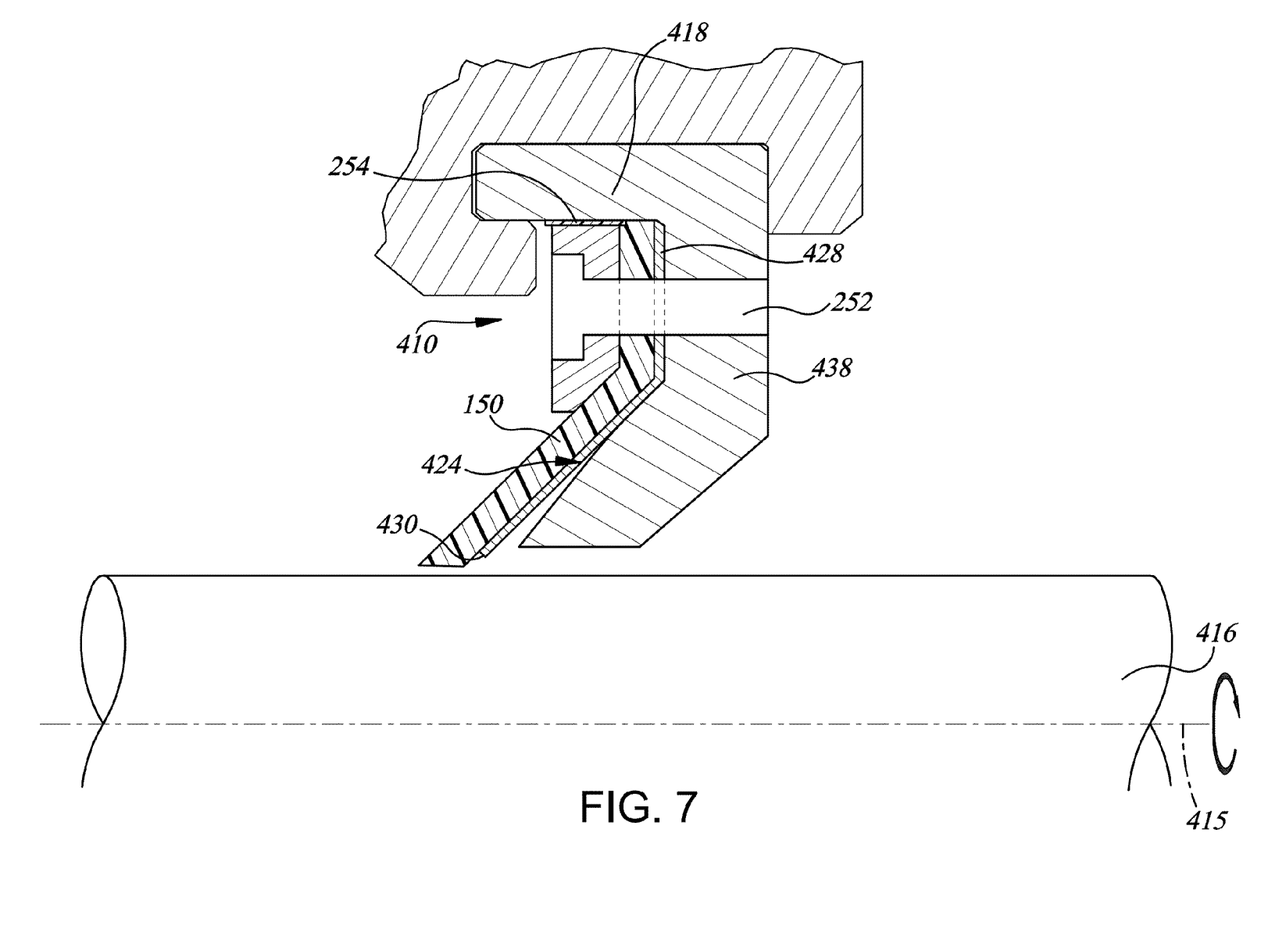
FIG. 7 shows a section view of an embodiment of the seal assembly according to embodiments of this invention.

Assembly of the seal components, as shown in FIGS. 6 and 7, can include a combination of mechanical clamping methods and/or appropriate adhesives. For example, a screw assembly 152 is shown in FIG. 6, for assembling the components arranged in a configuration similar to FIG. 3. FIG. 7 shows a screw assembly 252 for assembling components arranged in a configuration similar to FIG. 4. Screw assemblies 152, 252 can include any known mechanical clamp, such as a screw or a series of screws, and can alternatively include an adhesive 254 as discussed in connection with FIG. 7.

Turning to FIG. 6, screw assembly 152 is shown in the arrangement where fixed end 128 is substantially parallel with respect to longitudinal axis 115 of rotor 116. In this arrangement, screw assembly 152 can be mounted substantially perpendicular to longitudinal axis 115, in holder/backing ring 118 which holds screw assembly in place in non-rotating component 114. Screw assembly 152 is screwed through leaf seal members 124 and polymer member 150, specifically through fixed end 128, into support member 138. Screw assembly 152 can include a series of screws, or any other now known or later developed mechanical securing means.

Turning to FIG. 7, screw assembly 252 is shown when fixed end 428 is substantially perpendicular with respect to longitudinal axis 415 of rotor 416. In this arrangement, screw assembly 252 can be mounted substantially parallel to longitudinal axis 415, within a retaining ring or holder 418. As in the arrangement in FIG. 6, screw assembly 252 is screwed through leaf seal members 424 and polymer member 150, specifically through fixed end 428, into support member 438. Screw assembly 252 can include a series of screws, or any other now known or later developed mechanical securing means. In addition, given the arrangement of the components in FIG. 7, screw assembly 252 can alternatively comprise either an adhesive 254 or an adhesive 254 used in conjunction with a typical mechanical clamp such as a screw. Because screw assembly 252 is provided on a high pressure side of leaf seal assembly 410, that high pressure will work together with screw assembly 252 to keep the components in place, thus, an adhesive 254 rather than a mechanical clamp, may be sufficient.

Polymer seal member 150 can comprise any high-temperature capable polymer such as a semicrystalline thermoplastic including polyamide (PA or also known as nylon), fluoroplastics such as polytetrafluoroethylene (PTFE such as Teflon®), polyetheretherketone (PEEK), polyethylene (PE), polypropylene (PP), polybutylene terephthalate (PBT) or polyethylene terephthalate (PET). These semicrystalline thermoplastics may also be filled with glass or other material or fiber to optimize seal performance. In addition, preferably polymer seal member 150 has a higher elasticity than underlying metallic leaf seal members 124, i.e., polymer seal member 150 may have a relatively low modulus of elasticity such as less than 1,000,000 lb/square inch. Using a resilient high temperature polymer with relatively low modulus of elasticity and tensile strength renders polymer seal member 150 compliant with underlying metallic leaf seal members 124 as differential seal pressure is applied. Polymer strength is adequate however to withstand applied seal pressure over the narrow seal slot 107 width in the metallic leaf seal members 124.

The width of slots 107 cut in shim stock strips is reduced when strips are bent at an acute angle relative to rotor axis 115

(FIG. 6) and wrapped about the axis into frusto-conical seal members. Slot widths 107 of only a few thousands of an inch can be achieved with wire EDM and other machining methods for cutting slots in the starting seal strip. The radius of support member 138 and thickness and length of leaf seal elements 124 are selected to provide a change in seal clearance with the application of seal pressure to avoid seal damage during startup and shutdown rotor transient movement. An additional benefit of certain embodiments of polymer member 150 is sacrificial 'wear in' during initial operation as discussed herein that is achieved in cooperation with the underlying metallic leaf seal members 124 and support member 150. Leaf seal members 124 contact with support member 138 limits any additional seal clearance closure at operating conditions. Metal leaf seal members 124 may be shorter than polymer member 150 to avoid metal contact with the shaft seal surface as discussed herein.

Figure 8:
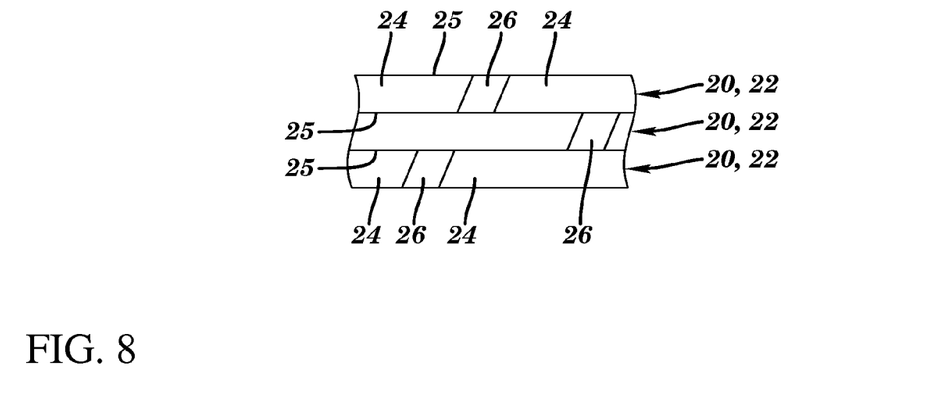
FIG. 8 shows a detail view of a number of elements configured with staggered slots according to embodiments of this invention.

Turning to FIG. 8, slots 26 may also be provided at a non-perpendicular angle relative to a surface 25 of each element 20, 22. FIG. 8 also illustrates how, in a preferred embodiment, slots 26 of elements 20, 22 are staggered between elements 20, 22. That is, elements 20, 22 are preferably juxtaposed such that seal members 24 of each element 20, 22 block slots 26 of another element 20, 22. This configuration reduces leakage through seal assembly 10 (FIGS. 1 and 3).

In addition as discussed in U.S. patent application Ser. No. 12/546,248, filed Aug. 24, 2009, which is hereby incorporated by reference, seal assembly 100 can further include at least one damping leaf layer. Damping leaf layer can be provided on the low pressure, $P_L$, side of leaf seal members 124, between leaf seal members 124 and support member 138. As discussed in more detail in application Ser. No. 12/546,248, damping leaf layer can comprise a plurality of damping leaves which can be approximately 20% shorter in length and can have a different natural frequency than the leaf seal members 124 they are assembled in contact with. Damping leaves can also be of the same material and thickness as leaf seal members 124, resulting in a substantially higher natural frequency than the longer leaf seal members 124 which are subject to flow excitation.

It should also be recognized that the seal assembly 100 in accordance with the present invention may be combined with one or more labyrinth seals and/or one or more brush seals (not shown) to provide further sealing capacity.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to about 25 wt %, or, more specifically, about 5 wt % to about 20 wt %", is inclusive of the endpoints and all intermediate values of the ranges of "about 5 wt % to about 25 wt %," etc).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A seal assembly for sealing against a rotatable component having a longitudinal axis, the seal assembly comprising:
   a leaf seal including a plurality of staggered leaf seal members, each leaf seal member including:
      a free portion arranged at an acute angle relative to the longitudinal axis of the rotatable component, wherein the free portion includes a free end positioned substantially adjacent a circumferential surface of the rotatable component; and
      a fixed portion angled relative to the free portion; and
   a polymer member disposed on a high pressure side of the leaf seal for substantially preventing axial flow of a fluid between the plurality of staggered leaf seal members, wherein the polymer member is concentrically positioned around the rotatable component and the leaf seal, and
   wherein the polymer member includes:
      a free portion arranged at an acute angle substantially similar to the acute angle of the free portion of each leaf seal member, the free portion of the polymer member having a free end positioned substantially adjacent the circumferential surface of the rotatable component and extending substantially beyond the free end of the free portion of each leaf seal member; and
      a fixed portion angled relative to the free portion of the polymer member.

2. The seal assembly of claim 1, wherein the free end of each leaf seal member and the free end of the polymer member contact the rotatable component in a pressurized operative state.

3. The seal assembly of claim 1, wherein the fixed portion of each leaf seal member is substantially parallel to the rotatable component.

4. The seal assembly of claim 1, wherein the polymer member is coupled to the leaf seal by a mechanical clamp.

5. The seal assembly of claim 1, wherein the fixed portion of each leaf seal member is substantially perpendicular to the rotatable component.

6. The seal assembly of claim 1, wherein the polymer member is coupled to the leaf seal by an adhesive.

7. The seal assembly of claim 1, wherein the polymer member comprises a 360 degree frusto-conical ring.

8. The seal assembly of claim 1, wherein the polymer member is thicker than each of the leaf seal members.

9. The seal assembly of claim 1, wherein the polymer member has a lower modulus of elasticity than the leaf seal members.

10. The seal assembly of claim 1, wherein the polymer member is selected from the group comprising: polyamide (PA), polytetrafluoroethylene (PTFE), polyetheretherketone (PEEK), polyethylene (PE), polypropylene (PP), polybutylene terephthalate (PBT) and polyethylene terephthalate (PET).

11. A rotary machine comprising:
    a rotatable component and a non-rotatable component, the rotatable component and the non-rotatable component lying about a common axis; and a seal assembly positioned substantially adjacent the rotatable component and coupled to the non-rotatable component, the seal assembly including:
   a leaf seal including a plurality of staggered leaf seal members, each leaf seal member including:
      a free portion arranged at an acute angle relative to the longitudinal axis of the rotatable component, wherein the free portion includes a free end positioned substantially adjacent a circumferential surface of the rotatable component; and
      a fixed portion angled relative to the free portion; and
   a polymer member disposed on a high pressure side of the leaf seal for substantially preventing axial flow of a fluid between the plurality of staggered leaf seal members, wherein the polymer member is concentrically positioned around the rotatable component and the leaf seal, and
wherein the polymer member includes:
   a free portion arranged at an acute angle substantially similar to the acute angle of the free portion of each leaf seal member, the free portion of the polymer member having a free end positioned substantially adjacent the circumferential surface of the rotatable component and extending substantially beyond the free end of the free portion of each leaf seal member; and
   a fixed portion angled relative to the free portion of the polymer member.

12. The rotary machine of claim 11, the free end of each leaf seal member and the free end of the polymer member contact the rotatable component in a pressurized operative state.

13. The rotary machine of claim 11, wherein the fixed portion of each leaf seal member is substantially parallel to the rotatable component.

14. The rotary machine of claim 11, wherein the polymer member is coupled to the leaf seal by a mechanical clamp.

15. The rotary machine of claim 14, wherein the fixed portion of each leaf seal member is substantially perpendicular to the rotatable component.

16. The rotary machine of claim 11, wherein the polymer member is coupled to the leaf seal by an adhesive.

17. The rotary machine of claim 11, wherein the polymer member comprises a 360 degree frusto-conical ring.

18. The rotary machine of claim 11, wherein the polymer member is thicker than each of the leaf seal members.

19. The rotary machine of claim 11, wherein the polymer member has a lower modulus of elasticity than the leaf seal members.

20. A seal assembly for sealing against a rotatable component having a longitudinal axis, the seal assembly comprising:
   a leaf seal including a plurality of staggered leaf seal members, each leaf seal member including:
      a free portion arranged at an acute angle relative to the longitudinal axis of the rotatable component; and
      a fixed portion that is angled relative to the free portion;
   a polymer member coupled to the leaf seal on a high pressure side for substantially preventing axial flow of a fluid between the plurality of staggered leaf seal members, the polymer member including:
      a free portion arranged at an acute angle substantially similar to the acute angle of the free portion of each leaf seal member, the free portion of the polymer extending substantially beyond the free portion of each leaf seal member; and
      a fixed portion angled relative to the free portion of the polymer member; and
   a support having a substantially frusto-conically shaped support portion facing the high pressure side of the leaf seal for supporting the free portion from a radially inward position relative to the free portion and a mount portion for coupling to a non-rotatable component,
wherein the free portion contacts only a proximate end of the support portion adjacent to the mount portion in an unpressurized state of the leaf seal and the free portion contacts both the proximate end and a distal end of the support portion in a pressurized state of the leaf seal, the free portion being closer to the rotatable component during the pressurized state than in the unpressurized state.

* * * * *